Patented Feb. 10, 1953

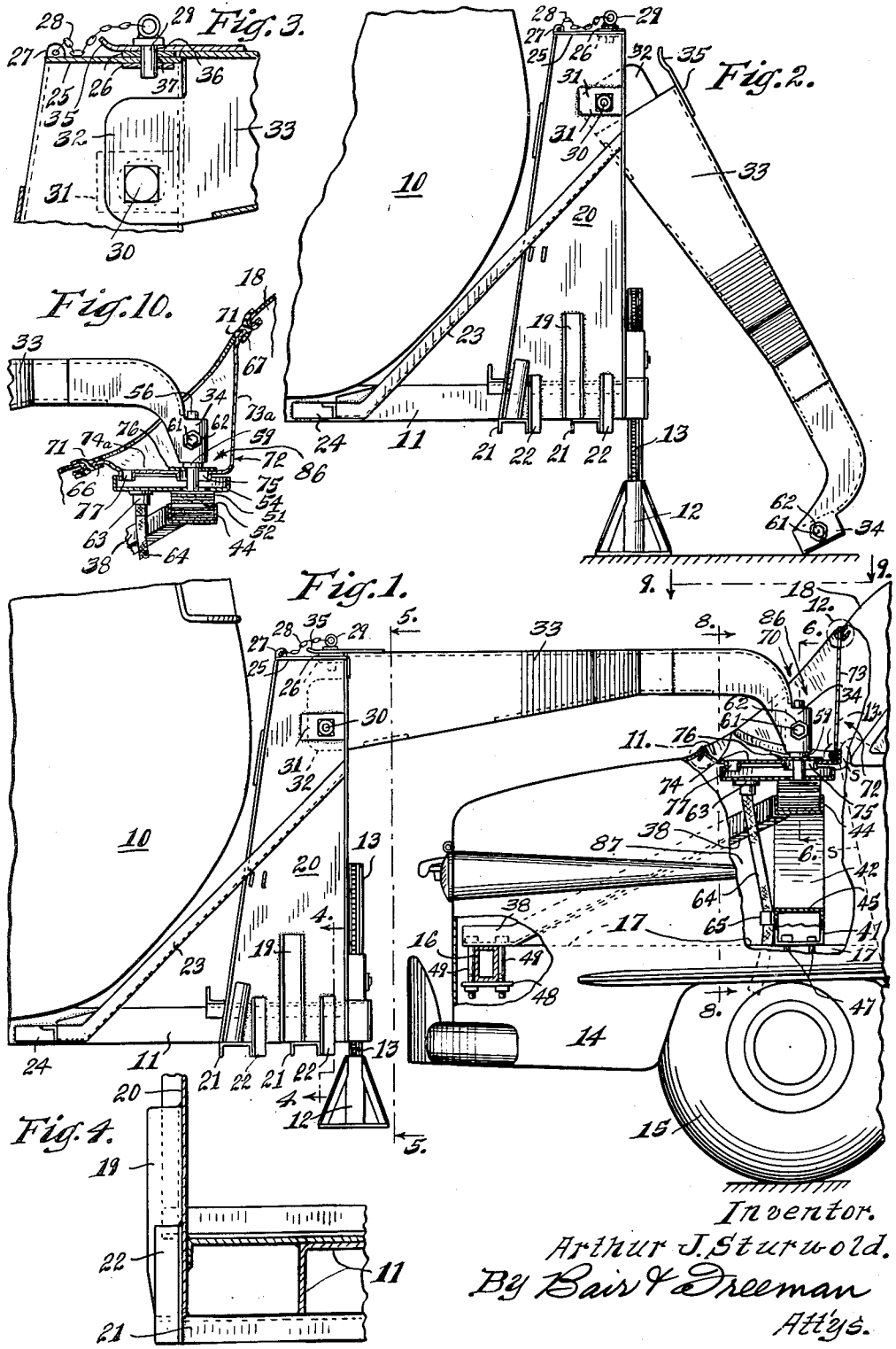

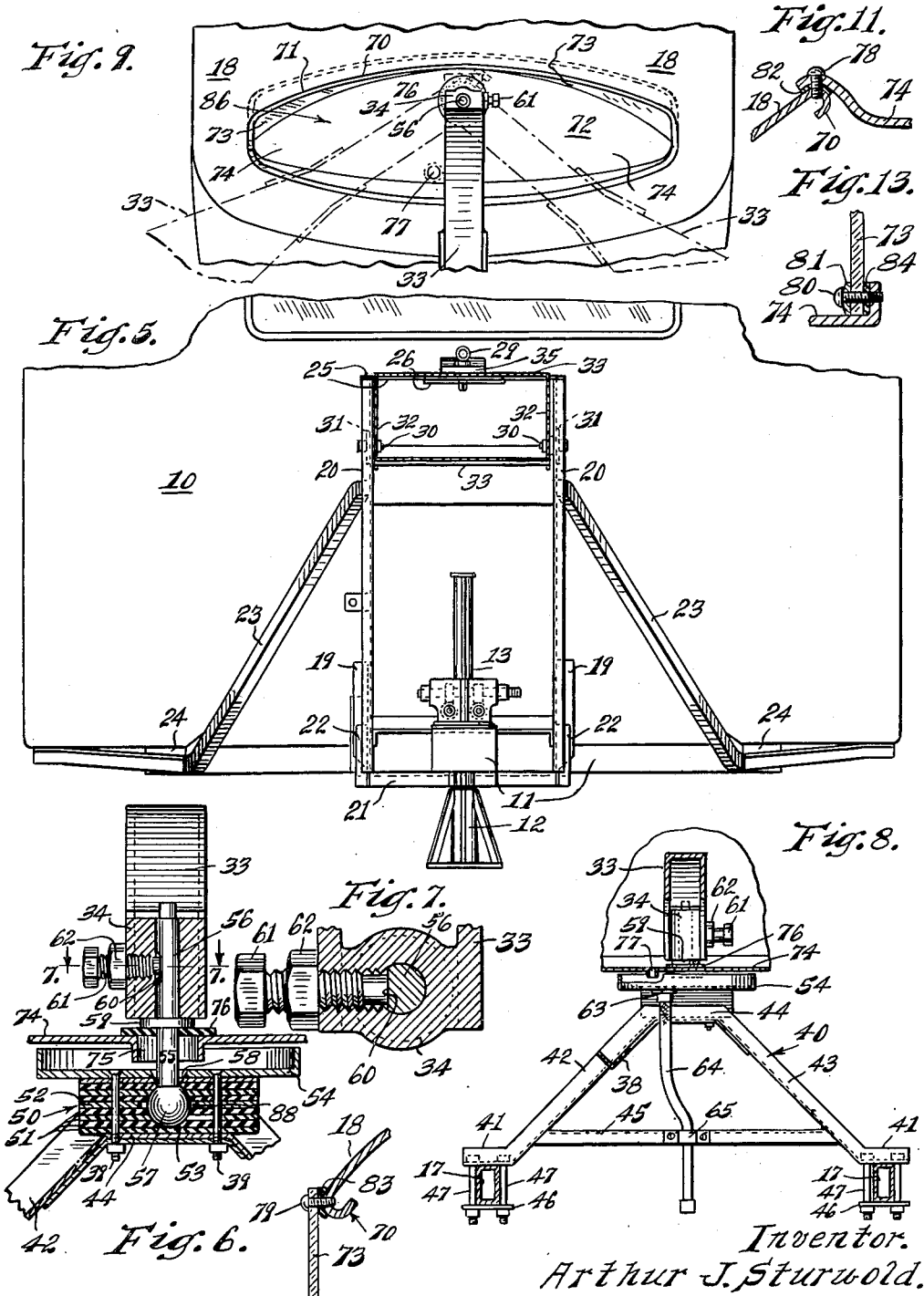

2,628,106

UNITED STATES PATENT OFFICE 2,628,106

TRAILER HITCH

Arthur J. Sturwold, Chicago, Ill.

Application July 16, 1949, Serial No. 105,097

15 Claims. (Cl. 280—33.05)

This invention relates to a trailer hitch and more particularly to a trailer hitch arrangement including an adapter for the automobile for eliminating sidesway in the trailer, and providing for proper loading on the wheels of the automobile.

Present methods of hitching trailers to automobiles are unsatisfactory in that they permit sidesway of the trailer. As a result of the sidesway, undesirable forces are imposed upon the automobile, making the vehicle difficult to control. It is well known that the fixing of the trailer in the vicinity of a point above the rear axle of the automobile provides what is known as a "fifth wheel" and eliminates the sidesway in the trailer. Furthermore, hitching of a trailer to any point of the automobile except above the rear axle affects the loading on the front wheels of the automobile. If the point of support of the trailer is directly above the rear axle, the entire vertical load at the point of support is transmitted solely to the rear wheels. If the point of support is behind the rear wheels, the loading on the front wheels is reduced, which is undesirable. If the point of support is forward of the rear axle, some of the load is distributed to the front wheels, which is desirable in some instances.

In the past it has been difficult to hitch a trailer to a point above or slightly forward of the rear axle of the automobile, particularly a sedan, because the rear seat was usually located over the rear wheel. The design of automobiles has recently been changed and the rear seats are now located between the axles of the automobile. The present trailers are provided only with structural members for attachment to the rear ends of the automobiles.

Thus, one of the objects of this invention is to provide a fifth wheel control for a trailer.

Another object of this invention is to provide a fifth wheel type trailer hitch for adaptation to modern automobiles.

Another object of this invention is to provide a means for adapting trailers and automobiles for use with a fifth wheel type trailer hitch.

Another object of this invention is to provide an automobile body member for easily altering modern automobiles to provide for a fifth wheel type trailer hitch.

Further objects and advantages of this invention will become apparent as the following description proceeds and the features of novelty which characterize this invention will be pointed out with particularity in the claims annexed to and forming a part of this specification.

A preferred embodiment of the invention is shown in the accompanying drawings in which:

Figure 1 is a side view of the trailer attached to an automobile by means of a fifth wheel type trailer hitch. The automobile is shown partially broken away.

Figure 2 is a side view of the trailer at rest showing the additional structure and the goose-necked connecting arm attached thereto, which is added to the trailer to adapt the trailer for use with the fifth wheel type trailer hitch.

Figure 3 is an enlarged view of the connections between the additional trailer structure and the goose-necked connecting arm attached thereto shown in Figure 2.

Figure 4 is a sectional view of structural elements taken on line 4—4 of Figure 1.

Figure 5 is a view of the trailer and the additional trailer structure and connecting arm attached thereto taken on the line 5—5 of Figure 1.

Figure 6 is a sectional view showing the details of the pin connection between the goose-necked connecting arm and the vertical pin mounted on the automobile taken on line 6—6 of Figure 1.

Figure 7 is a sectional view of the locking device of the trailer hitch taken on line 7—7 of Figure 6.

Figure 8 is a view of the supporting structure for the vertical portion of the fifth wheel type trailer hitch taken on line 8—8 of Figure 1.

Figure 9 is a plan view looking down on the rear window frame of the automobile showing the rear window removed and the window adapter installed therein. The relative motion of the goose-necked trailer hitch to the window frame is also shown in this view.

Figure 10 is a sectional view of a window adapter showing an alternate construction and is similar to part of the view in Figure 1.

Figures 11, 12 and 13 are detail views of the juncture points between members, which juncture points are shown encircled and numbered in Figure 1.

Referring now to Figure 1, there is shown a trailer 10 with the usual structural towing member 11 attached thereto. A skid 12, attached to jack 13 and mounted on member 11, provides a support when the trailer is at rest, shown in Figure 2. Also shown in Figure 1 is the rear end of an automobile 14 and the rear wheels 15. The existing structure of the automobile shown is a transverse structural frame member 16 and longitudinal structural members 17. The part of the body bounding the rear window is designated 18.

As shown in Figures 1 and 2, there is added to the existing structure of the trailer described above two vertically extending channel sections 20 welded on both sides of towing member 11. Welded to the webs of channels 20, with their own webs flat against the bottom of tow 11, are two channels 21. To further strengthen the connection, angles 22 and channel 19 are welded to the web of channel 20 with angles 22 being further welded to a leg of channels 21. To provide greater torsional rigidity, angles 23 are welded at one end to one leg of channel 20 and at the other end to a structural member 24 which in turn is firmly fastened to towing member 11. The top ends of channel 20 are joined by a flat plate 25 on both sides of which are mounted two reinforcing strips 26. Also attached to plate 25 is an ear 27 to which is fastened, by means of a chain 28, a pin 29.

Located below the top ends of the channels 20 and passing through the webs of channels 20 are bolts 30. The webs of channel 20 at these points are reinforced by straps 31. Pivotally mounted on bolts 30 by means of ears 32 is a goose-necked connecting arm 33 of substantially box beam construction. Attached to the goose-necked extended end of the connecting arm is a collar 34 providing part of the connection between the trailer and the automobile. Attached to the top side of arm 33 at the end adjacent ears 32 is a bent strip 35 which provides a spring type clasp for keeping arm 33 in a horizontal position. As shown in Figure 3, strip 35 has a hole 36 in it which, when in register with the hole 37 through members 25 and 26, provides a passageway into which pin 29 fits so as to fix arm 33 in the horizontal position. By removing pin 29 and lifting clasp 35, arm 33 is released from position and will fall to the position shown in Figure 2.

As shown in Figures 1 and 8, there is added to the existing structure of the automobile described above a structural member 40 which is clearly shown in Figure 8. Member 40, a channel shaped section which faces upwards, is located in the trunk chamber 87 of the automobile and has two horizontal sections 41 for fastening to the frame of the car, two sloping sections 42 and 43, and a horizontal channel section 44 joining the two top ends of sections 42 and 43. To provide additional stiffness, downward facing channel section 45 connects section 42 and 43 near their lower ends. Horizontal channel sections 41 are attached to the longitudinal automobile frame members 17 by means of a plate 46 and bolts 47. To longitudinally stabilize the A-shaped member 40, an angle section 38 is welded at one end to sloping member 42 and connected at the other end to transverse automobile members 16 by means of a plate 48 and bolts 49.

Referring next to Figures 1 and 6, there is shown in the channel section 44 a bearing block 50 built up of a plurality of layers 51 of fiber or leather and one layer of steel 52 located substantially in the center of block 50. All of the layers 51 and layer 52 are so cut out that when in correct alignment and register they form a hollow spherical bearing socket 53. Bearing on the top layer of fiber is a dish-type layer 54 which is cut out to provide passage therethrough for the pin 56 of ball ended pin 55. The ball end 57 of member 55, positioned in the spherical bearing socket 53, provides a universal bearing for pin 56. In order that the layers of fiber 51 and the dish-type plate 54 do not interfere with the motion of pin 56, these members 51 and 54 are cut back to contour 58 to provide a cone of turning for pin 56. The entire bearing block assembly is rigidly secured to channel section 44 by means of bolts 39 which pass through plate 54, the layers of fiber 51, the layer of steel 52, and through the web of channel section 44. Steel plate 52 is cut back a greater amount than are the adjacent layers of fiber, thus providing a chamber 88 for storage of lubricant.

The connection between the goose-necked connecting arm 33 and the automobile is clearly shown in Figure 6 wherein is shown the collar 34 attached to the goose-necked connecting arm, and the pin 56 over which collar 34 fits. Mounted on pin 56 is a shoulder 59 against which collar 34 butts. Pin 56 has a keyway 60 therein adapted to receive set screw 61 mounted in and threaded to collar 34. Set screw 61 is provided with a lock nut 62 for retaining set screw 61 in position.

Referring back to the dish-type plate 54 as shown in Figures 1, 6 and 8, said member 54 is provided with a drain 63 to which is attached a hose or tube 64 for draining off any water which accumulates on plate 54 to the outside of the automobile. Hose 64 is kept in position by clamp 65 attached to channel member 45.

Referring next to Figures 1 and 9, the part of the automobile bounding the rear window is designated 18. The actual contour of the window frame is 70. A rubber grommet 71 is provided for fixing the window in the window frame 70. As shown in Figures 1, 11 and 12, the customary rear shelf, the customary rear window and the customary rubber grommet 71 are removed from the automobile. A new rear shelf 74 is installed and is fastened to the window frame 70 by screws 78. A new rear window portion 73 is made of a transparent plastic material and is fixed at one end to shelf 74. The other end of rear window portion 73 is fixed to window frame 70 by screws 79 as shown in Figure 12. The connections to the window frame are made waterproof by gaskets or gasketing material 82 and 83. Members 73 and 74 are fastened to each other by means of screws 80 and soft aluminum bead 81 as shown in Figure 13. Gasket 84 is provided to make this latter joint waterproof.

An alternate construction for the new shelf and replacement window is shown in Figure 10. Using the same rubber grommet 71 as a mounting, an attachment member 72 is shown forming a window portion 73a and a rear shelf portion 74a. The greater part of window portion 73a is flat and is positioned in an upright manner. However, near the edges the flat portion is flared to a pronounced lip 66 which is of the same peripheral shape, contour, thickness and slope as that part of the original window which it is replacing. Such a lip permits mounting of window portion 73a in grommet 71. Similarly, the greater part of shelf portion 74a is flat and positioned horizontally. Near the edges of portion 74a the flat portion is flared to a pronounced lip 67 which is of the same peripheral shape, contour, thickness and slope as that part of the original window which portion 74a is replacing. Such a lip permits mounting of shelf portion 74a in grommet 71.

It will be noted that a window chamber 86 is initially formed in the automobile by the rear shelf, the automobile body, and a geometrical plane that extends upward from the rear shelf adjacent the back seat S to the roof or upper side of the automobile body. Before the modifications described hereinabove, this window chamber is open to the interior of the automobile and sealed off from the outside of the automobile by the rear window. After the modifications, wherein the rear window and the rear shelf are removed and the new rear window 73 and rear shelf 74, shown in Figure 1, or attachment member 72, shown in Figure 10, is installed, this window chamber 86 is open to the outside through the window aperture bounded by window frame 70, and is sealed off from the inside of the automobile by the replacement parts.

The rear shelf portion 74 is cut out to form opening 75 through which extends pin 56.

Opening 75 is wide enough so that shelf 74 does not interfere with the cone of action of pin 56. A rubber gasket 76 is provided to seal opening 75 and still permit motion of pin 56. Since shelf 74 is open to the elements, it will collect water and therefore drain 77 is provided therein to dispose of any accumulated water to plate 54 where it passes through drain 63, through hose 64, and out of the automobile. Some of the moisture received by plate 54 enters bearing block 50 and serves as a lubricant. It is here noted that if it is desired to keep moisture out of the bearing block 50, a rubber seal could be provided between plate 54 and pin 56 thus sealing off the top of bearing block 50.

In order to adapt the automobile so as to receive the fifth wheel type trailer hitch, the original rear window and the rear shelf between the back seat and the body are removed. The A frame type structure shown in Figures 1 and 8 is added. The bearing block 50 is built up by layers around the ball ended pin 55 and the dish-type plate 54 is then installed. The entire bearing block assembly comprising plate 54 and layers 51 and 52 and channel section 44 are then bolted together by bolts 39. Then, in order to seal the car and still leave the pin 56 in the open, there is provided body member 72 comprising sections 73 and 74 and adapted to the existing rear window frame. Member 72 also provides an opening through shelf portion 74 through which pin 56 protrudes into the window chamber 86 which is now open to the outside. In this manner, the car is sealed and a point of support is provided over the rear axle or slightly ahead of the rear axle to which the connecting arm of the trailer may be attached.

Thus it can be seen that I have provided an attachment between a trailer and an automobile which is easily adaptable to both vehicles, which provides a fifth wheel type trailer hitch and eliminates sidesway in the trailer, and which results in a desirable distribution of weight on the wheels of the automobile.

Some changes may be made in the construction and arrangement of the parts of my trailer hitch without departing from the real spirit and purpose of my invention, and it is my intention to cover by my claims any modified forms of structure or use of mechanical equivalents which may be reasonably included within their scope.

I claim as my invention:

1. A fifth wheel type trailer hitch for use between a trailer and an automobile which automobile includes a frame, a body, a rear axle, a rear seat, a horizontal shelf between the back of said rear seat and the rear portion of the body, one portion of said automobile body and the back of said rear seat bounding a trunk chamber below the horizontal shelf, another portion of said automobile body and the horizontal shelf bounding a window chamber above said horizontal shelf, and a window aperture formed in the portion of the automobile body bounding said window chamber; said trailer hitch comprising a universally movable member, means attached to said automobile for supporting said universally movable member substantially in the region above the rear axle of the automobile and within the window chamber of said automobile, means mounted on said trailer for entering the window chamber of said automobile and engaging said universally movable member mounted on said automobile, and a member adapted to be attached to the edges of said window aperture so that the window chamber is open to the outside of the automobile body and substantially sealed off from the interior of said automobile.

2. A fifth wheel type trailer hitch for use between a trailer and an automobile which automobile includes a frame, a body, a rear axle, a rear seat, and a horizontal shelf between the back of the rear seat and the rear portion of the body, a first portion of said automobile body and the back of said rear seat bounding a trunk chamber below said horizontal shelf, a second portion of said automobile body and the horizontal shelf and a geometrical plane, extending upwards from the shelf adjacent the rear seat to the upper side of said automobile body bounding a window chamber above said horizontal shelf; said trailer hitch comprising a universally movable member, means attached to said automobile for supporting said universally movable member substantially near the region above the rear axle of the automobile and within the window chamber of said automobile, said means comprising a bearing having a spherical socket therein mounted on a structure located substantially in the trunk chamber of said automobile and attached to the frame of said automobile, a ball-ended pin mounted in said spherical socket and extending vertically into said window chamber of the automobile, and means mounted on said trailer for entering the window chamber of said automobile and engaging said universally movable member mounted on said automobile.

3. A fifth wheel type trailer hitch for use between a trailer and an automobile which automobile includes a frame, a body, a rear axle, a rear seat, and a horizontal shelf between the back of the rear seat and the rear portion of the body, a first portion of said automobile body and the back of said rear seat bounding a trunk chamber below said horizontal shelf, a second portion of said automobile body and the horizontal shelf bounding a window chamber above said horizontal shelf; said trailer hitch comprising a universally movable member, means attached to said automobile for supporting said universally movable member substantially near the region above the rear axle of the automobile and within the window chamber of said automobile, and means mounted on said trailer for entering the window chamber of said automobile and engaging said universally movable member mounted on said automobile, said means comprising a horizontally extending goose-necked arm and a collar mounted at the extended end of said arm.

4. A fifth wheel type trailer hitch for use between a trailer and an automobile which automobile includes a frame, a body, a rear axle, a rear seat, a horizontal shelf between the back of said rear seat and the rear portion of the body, a rear window frame, and a rear window, a first portion of said automobile body and the back of said rear seat bounding a trunk chamber below said horizontal shelf, a second portion of said automobile body and the horizontal shelf bounding a window chamber above said horizontal shelf, said window chamber being open to the interior of the automobile and sealed off from the outside by said rear window; said trailer hitch comprising a universally movable member, means attached to said automobile for supporting said universally movable member substantially in the region above the rear axle of the automobile and within the window chamber of said automobile, means mounted on said trailer for entering the window chamber of said automobile and engaging said universally movable member mounted on said automobile, and means adapted to be attached to said automobile so that the window chamber is open to the outside and substantially sealed off from the interior of said automobile, the latter means comprising the window frame from which the rear window is removed, the horizontal shelf being removed, and a molded transparent body having an elongated distorted bell shape, the bell mouth of said molded body having lips of the same peripheral shape, contour, thickness and slope as the border of the original window so as to permit mounting of said molded body in the same window frame, said distorted bell shape further providing two substantially flat surfaces, one serving as a horizontal shelf and the other as a rear window, the last said horizontal shelf having an opening therein through which passes said universally movable member.

5. A fifth wheel type trailer hitch for use between a trailer and an automobile which automobile includes a frame, a body, a rear axle, a rear seat, a horizontal shelf between the back of said rear seat and the rear portion of the body, a rear window frame, and a rear window, a first portion of said automobile body and the back of said rear seat bounding a trunk chamber below said horizontal shelf, a second portion of said automobile body and the horizontal shelf and a geometrical plane, extending upwards from the shelf adjacent the rear seat to the upper side of said automobile body, bounding a window chamber above said horizontal shelf, said window chamber being open to the interior of the automobile and sealed off from the outside by said rear window; said trailer hitch comprising a universally movable member, means attached to said automobile for supporting said universally movable member substantially in the region above the rear axle of the automobile and within the window chamber of said automobile, means mounted on said trailer for entering the window chamber of said automobile and engaging said universally movable member mounted on said automobile, and means for changing said automobile so that the window chamber is open to the outside and substantially sealed off from the interior of said automobile, the latter means comprising the window frame from which the rear window is removed, the horizontal shelf being removed, and a substantially horizontal rear shelf portion and a substantially upright transparent portion fixedly fastened together as a unit and adapted and fastened to the window frame, the last said horizontal shelf having an opening through which passes said universally movable member.

6. An automobile body part for use with an automobile, which automobile has a rear window frame, a mounting grommet in said rear window frame, a rear window, and a rear shelf adjacent the rear window, said rear window and rear shelf being removed to afford use of a fifth wheel type trailer hitch attachment having a vertically extending pin mounted on said automobile in the immediate vicinity of said rear window and rear shelf, said automobile body part comprising a molded transparent body having an elongated distorted bell shape including a mouth, lips of the same peripheral shape, contour, thickness and slope as the border of the original window formed on said mouth to afford mounting of said molded body in the same window frame and mounting grommet, and two substantially flat surfaces, one serving as a horizontal shelf and the other as a rear window, provided by said molded body, said horizontal shelf having an opening therein through which said vertically extending pin passes.

7. An automobile body part for use with an automobile, which automobile has a rear window frame, a mounting grommet in said rear window frame, a rear window, and a rear shelf adjacent the rear window, said rear window and rear shelf being removed to permit use of a fifth wheel type trailer hitch attachment having a vertically extending pin mounted on said automobile in the immediate vicinity of said rear window and rear shelf, said automobile body part comprising a molded transparent body having an elongated distorted bell shape including a mouth, lips of the same peripheral shape, contour, thickness and slope as the border of the original window formed on said mouth to afford mounting of said molded body in the same window frame and mounting grommet, and two substantially flat surfaces, one serving as a horizontal shelf and the other as a rear window, said horizontal shelf having a plurality of openings therein through one of which passes said vertically extending pin, and another of said openings serving as a drain.

8. An automobile body part for use with an automobile, which automobile has a rear window frame, a rear window, and a rear shelf adjacent the rear window, said rear window and rear shelf being removable to afford use of a fifth wheel type trailer hitch attachment having a vertically extending pin mounted on said automobile in the immediate vicinity of said rear window and rear shelf, said automobile body part comprising a substantially horizontal rear shelf portion and a substantially upright transparent portion fastened together, and means for adapting and fastening the rear shelf portion and the transparent portion to the rear window frame, the last said horizontal rear shelf portion having an opening therein through which passes said vertically extending pin.

9. A fifth wheel type trailer hitch for use between a trailer and an automobile, which automobile includes a frame, a body, a rear axle, a rear seat, and a horizontal shelf between the back of the rear seat and the rear portion of the body, a first portion of said automobile body and the back of said rear seat bounding a trunk chamber, and a second portion of said automobile body and the horizontal shelf and a geometrical plane, extending upwards from the shelf adjacent the rear seat to the upper side of said automobile body, bounding a window chamber; said trailer hitch comprising a universally movable vertically extending pin positioned substantially near the region above the rear axle of said automobile, means for supporting a bearing having a spherical socket therein, said means comprising a structure mounted upon said automobile frame and located substantially in the trunk chamber of said automobile, said universally movable vertically extending pin being ball-ended and mounted in said spherical socket and extending upwardly into said window chamber of the automobile, and means mounted on said trailer comprising a laterally extending arm and connecting means mounted at the extended end of said arm for engaging said upwardly extending pin to provide a rigid connection.

10. A fifth wheel type trailer hitch for use between a trailer and an automobile, which automobile includes a frame, a body, a rear axle, a rear seat, and a horizontal shelf between the back of the rear seat and the rear portion of the body, and a rear window, a first portion of said automobile body and the back of said rear seat bounding a trunk chamber, a second portion of said automobile body and the horizontal shelf and a geometrical plane, extending upwards from the shelf adjacent the rear seat to the upper side of said automobile body, bounding a window chamber, and an outside entrance to said window chamber created by removing the original rear window of said automobile; said trailer hitch comprising a universally movable vertically extending pin positioned substantially near the region above the rear axle of said automobile, means for supporting a bearing having a spherical socket therein, said means comprising a structure mounted upon said automobile frame and located substantially in the trunk chamber of said automobile, said vertically extending pin being ball-ended and mounted in said spherical socket and extending upwardly through said horizontal shelf into said window chamber of the automobile, and means for connecting said trailer to the automobile comprising a laterally extending arm and a collar mounted at the extended end of said arm, the extended end of said arm entering said window chamber through the outside entrance and engaging said upwardly extending pin to provide a rigid connection.

11. A fifth wheel type trailer hitch for use between a trailer and an automobile, which automobile includes a body, a rear axle, a rear seat, a horizontal shelf between the back of said rear seat and the rear portion of the body, a first portion of said automobile body and the back of rear seat bounding a trunk chamber, a second portion of said automobile body and the horizontal shelf and a geometrical plane, extending uuwards from the shelf adjacent the rear seat to the upper side of said automobile body, bounding a window chamber; said trailer hitch comprising a universally movable member, means in said trunk chamber attached to said automobile for supporting said universally movable member in the region substantially above the rear axle of the automobile and within the window chamber of said automobile, and means mounted on said trailer for entering the window chamber of said automobile and engaging said universally movable member mounted on said automobile.

12. A fifth wheel type trailer hitch for use between a trailer and an automobile, which automobile includes a body, a rear axle, a rear seat, a horizontal shelf between the back of said rear seat and the body, said automobile body and the horizontal shelf and a plane, extending upwards from the shelf adjacent the rear seat to the upper side of said automobile body, bounding a window chamber, said trailer hitch comprising a first portion of a hitching connection mounted substantially in the region substantially above the rear axle of the automobile and within the window chamber of said automobile, and a second portion of the hitching connection being mounted on the trailer and adapted to enter the window chamber of said automobile and engage said first portion of the hitching connection.

13. A fifth wheel type trailer hitch for use between a trailer and an automobile, which automobile includes a rear axle, and a body, said automobile body bounding an aperture therein for a rear window, said trailer hitch comprising a first portion of a hitching connection secured to the automobile at a region substantially above the rear axle of the automobile, a second portion of the hitching connection being secured to the trailer, one of said portions of said hitching connection being mounted on an arm which extends through the rear window aperture of said automobile to where the portions of the hitching connection are joined together, one of said portions of said hitching connection comprising a bearing having a spherical socket therein and a ball ended pin mounted in said spherical socket and adapted to be seized by the other portion of said hitching connection.

14. A fifth wheel type trailer hitch for use between a trailer and an automobile, which automobile includes a body, a rear axle, a rear seat, a horizontal shelf between the back of said rear seat and the rear portion of the body, said automobile body and the horizontal shelf and a geometrical plane, extending upwards from the shelf adjacent the rear seat to the upper side of said automobile body, bounding a window chamber, said trailer hitch comprising a first portion of a hitching connection secured to the automobile at a region substantially above the rear axle of the automobile, a second portion of the hitching connection being secured to the trailer, one of said portions of said hitching connection being mounted on an arm which extends through the rear window aperture of said automobile to where the portions of the hitching connection are joined together, and a member for changing said automobile so that the window chamber is open to the outside and substantially sealed off from the interior of said automobile, said member having an opening therein through which passes a portion of the trailer hitch connection.

15. An automobile part for use with an automobile, which automobile has an aperture therein for a rear window, a mounting grommet associated with said rear window aperture, a rear window, and a rear shelf adjacent the rear window, said rear window and rear shelf being removed to afford use of a fifth wheel type trailer hitch attachment, a portion of which trailer hitch attachment extends through said rear window aperture, said automoble body part comprising a molded, transparent body having an elongated distorted bell shape including a mouth, lips of the same peripheral shape, contour, thickness and slope as the border of the original window, formed on said mouth to afford mounting of said molded body in the same rear window aperture and mounting grommet, and two substantially flat surfaces, one serving as a horizontal shelf and the other as a rear window, provided by said molded body, said horizontal shelf having an opening therein through which passes a portion of the trailer hitch attachment.

ARTHUR J. STURWOLD.

REFERENCES CITED

The following references are of record in the file of this patent:

UNITED STATES PATENTS

| Number | Name | Date |
| --- | --- | --- |
| 1,916,967 | Curtiss | July 4, 1933 |
| 1,926,177 | Robinson | Sept. 12, 1933 |
| 1,983,317 | Seltz | Dec. 4, 1934 |
| 2,162,481 | Fry | June 13, 1939 |
| 2,425,838 | Schultz | Aug. 19, 1947 |